May 21, 1957  W. J. VAN DER GRINTEN  2,793,244
SOLID ELECTROLYTE CELLS AND BATTERIES
Filed May 11, 1954
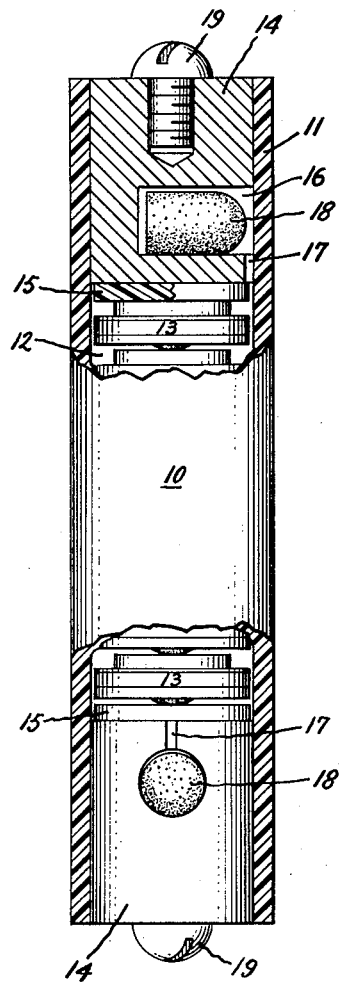
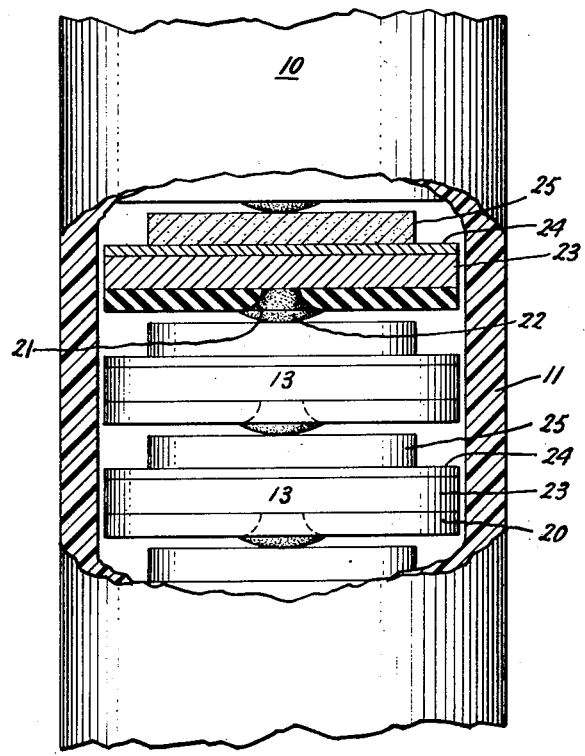
Inventor:
Willem J. van der Grinten,
by Paul A. Frank
His Attorney.

United States Patent Office 2,793,244
Patented May 21, 1957

2,793,244

SOLID ELECTROLYTE CELLS AND BATTERIES

Willem J. van der Grinten, Ballston Lake, N. Y., assignor to General Electric Company, a corporation of New York Application May 11, 1954, Serial No. 429,062

17 Claims. (Cl. 136—111)

This invention relates to batteries and specifically to cells and batteries which contain solid electrolytes.

Batteries, which contain solid electrolytes, are desirable as low current power sources for electrical devices, such as transistors, radiation meters, amplifiers, image tubes, exposure meters, and for the charging of capacitors. It is desirable that such batteries be compact and leakproof. In those cases, where a compact, leak-proof battery with a long shelf life is required, a conventional liquid electrolyte battery is unsuitable.

Accordingly, it is an object of my invention to provide an improved battery with a solid electrolyte.

It is another object of the invention to provide a solid electrolyte type battery which may consist of any number of cells to give the desired voltage and capacity.

It is another object of the invention to provide a solid electrolyte type battery with a relatively long shelf life as well as an active life.

It is another object of the invention to provide a solid electrolyte type battery with a drying chamber to control the humidity.

It is another object of the invention to provide a miniature solid electrolyte type battery.

It is a further object of the invention to provide a novel method of producing a solid electrolyte type cell.

In carrying out my invention in one form, a solid metallic halide electrolyte is arranged between the anode and cathode of each cell to provide a multiple cell battery.

These and various other objects, features and advantages of the invention will be better understood from the following description taken in connection with the accompanying drawing in which:

Fig. 1 is a sectional view of a multiple cell battery which embodies my invention; and Fig. 2 is an enlarged sectional view of the battery which is shown in Fig. 1.

In Fig. 1 of the drawing, a multiple cell battery which is indicated generally at 10, comprises a casing 11 to define a chamber 12 in which a plurality of individual solid cells 13 are stacked between opposed terminal electrodes 14. The casing 11 may be composed of a suitable insulating material, such as, for example, plastic, glass or ceramics. A conductive rubber cushion 15 may be provided between the ends of the stacked cells 13 and each of the terminal electrodes 14 to promote additional elasticity near these cells. In each of the terminal electrodes 14, a conduit 16 is shown which communicates with the chamber 12 through a groove 17. A drying or dehumidifying agent 18 in capsule form is positioned in the conduit 16 to control the humidity of the cells 13. The maintenance of a solid electrolyte type battery in an atmosphere of relatively low, constant humidity is beneficial to the constancy of its performance. Satisfactory materials, which may be used as drying agents, are anhydrous cupric sulfate ($CuSO_4$) and anhydrous magnesium perchlorate ($Mg(ClO_4)_2$). Suitable battery connections may be provided for each of the electrodes 14, such as, for example, terminal screws 19.

In Fig. 2, a series of cells 13 are shown stacked within the casing 11 of the battery 10. Each cell 13 comprises an insulating base 20 with a central aperture 21 therethrough to permit the attachment of a conducting contact in the form of a carbon button 22. Satisfactory materials for the base 20 are resins, and baking varnishes. A solid anode 23 in the form of a wafer-like layer or foil of silver or lead is positioned on the insulating base 20. A solid metallic halide electrolyte 24, which must be chemically compatible with the anode 23, is arranged in juxtaposition thereon. When a plurality of solid metallic halide electrolytes are used in the cell construction, adjacent electrolytes must be chemically compatible in addition to the chemical compatibility between the anode 23 and its adjacent electrolyte. The conductivity of such an electrolyte is considerably improved by the addition thereto of small amounts of additives or impurities. Satisfactory metals for the halide of the electrolyte 24 are silver and lead. A permeable solid cathode 25, which must be capable of producing a low pressure reacting gas with the anode material 23 to form an additional solid electrolyte layer during the operation of the battery 10, is positioned on the electrolyte 24. The cathode 25 must be chemically compatible with the electrolyte 24. Chemical compatibility must also exist between the cathode 25 and its adjacent electrolyte in a plural electrolyte cell. Such reacting gases are produced by solid mixtures of carbon with a halide which reacting gases exhibit a minimum pressure of $10^{-6}$ millimeters of Hg. Examples of suitable solid chemical cathodes are cupric chloride ($CuCl_2 \cdot 2H_2O$) and carbon, cupric bromide ($CuBr_2$) and carbon, ferric chloride ($FeCl_3$) and carbon.

The combination of a silver anode, a silver chloride electrolyte, and a cupric chloride and carbon cathode in a solid cell yields a cell voltage of about .5 volt, whereas the combination of a lead anode, lead chloride electrolyte, and chlorine adsorbed on a carbon cathode yields about 1.5 volts per cell. Other solid cell combinations will exhibit intermediate voltages.

In the construction of a multiple cell battery in accordance with my invention, a silver anode 23 is thoroughly cleaned, folded, and then heated in a halide gas atmosphere, such as, for example, a chlorine gas atmosphere, in an electric oven in which the temperature does not exceed 400° C. to produce a metallic halide layer 24 thereon. The anode 23 may be exposed to a series of different halide vapors to form a plurality of metallic halide layers. The perforated insulation layer 20 is then applied to the uncoated surface of the anode 23 to which a plurality of carbon buttons 22 are attached. The cathode layer 25, which may be a solid mixture of carbon with a halide, hypochlorite, absorbed gas, or a combination thereof, such as, for example, a carbon and cupric chloride mixture, is deposited on the metallic halide layer 24 in the form of a slurry with absolute ethyl alcohol as a solvent for the cupric chloride. The cathode layer 25 is preferably applied to the electrolyte layer 24 through a masking templet to avoid shorting when the sheet is punched out to provide a plurality of cells 13. The coated sheet is then punched out to provide a plurality of individual cells 13 to fit snugly in series within the casing 11 of the multiple cell battery 10.

The low current densities, which are obtained from such cells or batteries, are due primarily to the limited conductivity of the solid electrolytes. The density of the cell current will depend on the type, structure and thickness of the electrolyte, the type and pressure of the reacting gas, the porosity of the cathode, and the cell surface area. These current densities are also temperature sensitive. The combination of a silver anode, a silver chloride electrolyte of about 10 microns thickness, and a cupric chloride and carbon cathode in a solid cell yields a short circuit current of about 2/10 milliampere per square inch of cell area at room temperature.

A drying agent capsule 18 is inserted into each of the conduits 16 of the terminal electrodes 14. The pair of terminal electrodes 14 with their rubber cushions 15 are then fitted into the ends of the casing 11 to complete the multiple cell battery assembly.

In a second cell assembly method, a sheet of lead or silver is placed preferably in a vacuum medium in which a chemically compatible metallic halide is evaporated onto one surface thereof to form the solid electrolyte 24. A sheet of perforated insulation and a plurality of carbon buttons are positioned on the reverse surface of the metal anode sheet in the atmosphere. Thereafter, the solid chemical cathode layer 25 is applied.

Another method of producing solid electrolyte type cells is to position a solid electrolyte layer and a solid cathode layer on the anode layer. These layers are then bonded together under pressure to provide a multi-layer sheet which is punched out to form the cells 13.

The cells 13 may be used individually as single cell power sources. Such cells may be constructed in any desired size or shape. A plurality of coated or bonded sheets may also be stacked together in a casing to provide a multiple cell battery. If it is desired to produce a more compact battery structure, the plurality of stacked, coated sheets may be rolled to form a cylindrical battery within a casing.

A solid electrolyte battery constructed in accordance with this invention will provide up to several hundred volts per inch. Thus the voltage of the battery may be varied with an increase or decrease in the number of cells which are stacked within the casing.

As it will be apparent to those skilled in the art, the objects of my invention are attained by the use of a solid metallic halide electrolyte which is positioned between the anode and cathode of a cell.

While other modifications of this invention and variations of structure which may be employed within the scope of the invention have not been described, the invention is intended to include all such as may be embraced within the following claims.

What I claim as new and desire to secure by Letters Patent of the United States is:

1. A solid cell comprising a solid anode selected from the class consisting of silver and lead, a low pressure reacting gas producing permeable solid chemical cathode comprising a mixture of a metallic halide and carbon, and at least one solid metallic halide electrolyte arranged between said anode and cathode, the metal of said halide being selected from the class consisting of silver and lead.

2. A solid cell comprising a solid anode selected from the class consisting of silver and lead, a low pressure reacting gas producing permeable solid chemical cathode comprising a mixture of a metallic halide and carbon, and a plurality of solid metallic halide electrolytes arranged between said anode and said cathode, the metals of said halides being selected from the class consisting of silver and lead.

3. The method of producing a solid cell, which comprises exposing one surface of a foil selected from the class consisting of silver and lead to a heated halide atmosphere to form a metallic halide layer thereon, and applying a low pressure reacting gas producing permeable solid chemical layer comprising a mixture of a metallic halide and carbon on said metallic halide layer.

4. The method of producing a solid cell, which comprises exposing one surface of a foil selected from the class consisting of silver and lead to a series of different halide vapors to form a plurality of metallic halide layers, and then applying a low pressure reacting gas producing permeable solid chemical layer comprising a mixture of a metallic halide and carbon thereon.

5. A solid cell comprising a solid metallic anode formed from a metal the metallic halide of which is a solid electrolyte, a low pressure reacting gas producing permeable solid cathode comprising a mixture of a metallic halide and carbon, and at least one metallic halide solid electrolyte arranged between said anode and said cathode.

6. A solid cell comprising a solid metallic anode formed from a metal the metallic halide of which is a solid electrolyte, a low pressure reacting gas producing permeable solid cathode comprising a mixture of a metallic halide and carbon, and a plurality of metallic halide solid electrolytes arranged between said anode and said cathode.

7. A solid cell comprising a solid metallic anode formed from a metal the metallic halide of which is a solid electrolyte, a low pressure reacting gas producing permeable solid cathode comprising a mixture of ferric chloride and carbon, and at least one metallic halide solid electrolyte arranged between said anode and cathode.

8. A solid cell comprising a solid metallic anode formed from a metal the metallic halide of which is a solid electrolyte, a low pressure reacting gas producing permeable solid cathode comprising a mixture of cupric chloride and carbon, and at least one metallic halide solid electrolyte arranged between said anode and cathode.

9. A solid cell comprising a solid metallic anode formed from a metal the metallic halide of which is a solid electrolyte, a low pressure reacting gas producing permeable solid cathode comprising a mixture of cupric bromide and carbon, and at least one metallic halide solid electrolyte arranged between said anode and cathode.

10. A solid cell comprising a solid silver anode, a low pressure reacting gas producing permeable solid cathode comprising a mixture of cupric bromide and carbon, and a solid electrolyte comprising silver bromide arranged between said anode and cathode.

11. A solid cell comprising a solid silver anode, a low pressure reacting gas producing permeable solid cathode comprising a mixture of ferric chloride and carbon, and a solid electrolyte comprising silver chloride arranged between said anode and cathode.

12. A solid cell comprising a solid silver anode, a low pressure reacting gas producing permeable solid cathode comprising a mixture of cupric chloride and carbon, and a solid electrolyte comprising silver chloride arranged between said anode and cathode.

13. A solid cell comprising a solid silver anode, a low pressure reacting gas producing permeable solid cathode comprising a mixture of cupric bromide and carbon, and a solid electrolyte comprising silver chloride arranged between said anode and cathode.

14. A multiple cell battery including an insulating casing, a plurality of solid cells arranged in stacked relationship within said casing, each of said solid cells comprising an insulating base, a solid metallic anode formed from a metal the metallic halide of which is a solid electrolyte, a low pressure reacting gas producing permeable solid cathode comprising a mixture of a metallic halide and carbon, at least one metallic halide solid electrolyte arranged between said anode and said cathode, conducting means extending through said insulating base in each cell to provide electrical connection to the anode thereof, all of said cells being connected in electrical series circuit relationship thereby, and terminal means on said casing to provide electrical connection to said series connected cells.

15. A multiple cell battery including an insulating casing, a plurality of solid cells arranged in stacked relationship within said casing, each of said solid cells comprising an insulating base, a solid silver anode mounted on said base, a low pressure reacting gas producing permeable solid cathode comprising a mixture of cupric bromide and carbon, at least one solid electrolyte comprising silver bromide arranged between said anode and said cathode, conducting means extending through said insulating base in each cell to provide electrical connection to the anode thereof, all of said cells being connected in electrical series circuit relationship thereby, and terminal means on said casing to provide electrical connection for said series connected cells.

16. A solid cell comprising a solid metallic anode formed from a metal the metallic halide of which is a solid electrolyte, a low pressure reacting gas producing solid cathode including an electrically conductive metallic halide, and at least one metallic halide solid electrolyte arranged between said anode and said cathode.

17. A solid cell comprising a solid metallic anode formed from a metal the metallic halide of which is a solid electrolyte, a low pressure reacting gas producing solid cathode comprising a mixture of a metallic halide and an electrically conductive material which does not chemically react with the materials of the cell, and at least one metallic halide solid electrolyte arranged between said anode and said cathode.

References Cited in the file of this patent
UNITED STATES PATENTS

| | | |
|---|---|---|
| 1,505,939 | Batchelor | Aug. 26, 1924 |
| 2,307,763 | Deibel | Jan. 12, 1943 |
| 2,689,876 | Lehovec | Sept. 21, 1954 |
| 2,690,465 | Broder | Sept. 28, 1954 |

FOREIGN PATENTS

| | | |
|---|---|---|
| 178,804 | Great Britain | Feb. 10, 1922 |